United States Patent
Ben Ayed (10) Patent No.: US 8,625,796 B1
(45) Date of Patent: Jan. 7, 2014

(54) METHOD FOR FACILITATING AUTHENTICATION USING PROXIMITY

(71) Applicant: Mourad Ben Ayed, Cupertino, CA (US)

(72) Inventor: Mourad Ben Ayed, Cupertino, CA (US)

( * ) Notice: Subject to any disclaimer, the term of this patent is extended or adjusted under 35 U.S.C. 154(b) by 0 days.

(21) Appl. No.: 13/689,760

(22) Filed: Nov. 30, 2012

(51) Int. Cl.
*H04K 1/00* (2006.01)

(52) U.S. Cl.
USPC .......................................... 380/258

(58) Field of Classification Search
None
See application file for complete search history.

(56) References Cited

U.S. PATENT DOCUMENTS

| | | | |
|---|---|---|---|
| 8,045,961 B2 | 10/2011 | Ayed | |
| 8,437,742 B2 * | 5/2013 | Garskof | 455/411 |
| 2003/0105725 A1 | 6/2003 | Hoffman et al. | |
| 2009/0104888 A1 | 4/2009 | Cox et al. | |
| 2009/0221266 A1 | 9/2009 | Ohta et al. | |
| 2010/0317323 A1 * | 12/2010 | Facemire et al. | 455/411 |
| 2013/0152168 A1 * | 6/2013 | Nasir et al. | 726/4 |

* cited by examiner

*Primary Examiner* — Cordelia Zecher
(74) *Attorney, Agent, or Firm* — Daniel B. Schein (57) ABSTRACT

A method for facilitating authentication enables to automatically log the user to an application multiple times as long as the user has not left proximity of the terminal since the last successful login.

20 Claims, 3 Drawing Sheets

METHOD FOR FACILITATING AUTHENTICATION USING PROXIMITY

FIELD OF THE INVENTION

The present invention relates to systems and methods for automatic login using historical proximity.

BACKGROUND

Mobile tablets are growing significantly in the enterprise, and are presenting new security and usability challenges.

Tablet generally have a timeout feature that logs out after a few minutes of idle time, however, in order to do any meaningful work on a tablet—such as reading a document—the tablet timeout has to be increased to 10-20 minutes. This creates numerous usability and security challenges:
- Timeout causes users to have to login numerous times a day, to the device and to the application. This is two logins, about 20 to 40 times a day.
- Setting longer timeout causes a new problem of devices left un-attended with active sessions, thus enabling anybody that finds the device un-restricted access to the network.
- Devices are lost.

Previous patents by the current inventor taught authentication based on Bluetooth proximity as well as proximity logout, however, the prior art did not teach using historical proximity in order to provide automatic login.

U.S. Pat. No. 8,045,961 by the current inventor, System for wireless authentication based on Bluetooth proximity, teaches a Bluetooth device that facilitates login using a Bluetooth device that stores the user credentials and that supplies them wirelessly over Bluetooth communication channel. It does not teach automatic login if the Bluetooth channel stayed above a threshold during a recent period of time, otherwise, asking for user credentials.

US patent application 20090221266 by Ohta et al, Mobile terminal, access control management device, and access control management method teaches a method to acquire access control rules from a mobile device and using them for access authentication. It does not teach automatic login if the Bluetooth channel stayed above a threshold during a recent period of time, otherwise, asking for user credentials.

US patent application 20030105725 by Hoffman et al, Token identification system for authorization of electronic transmission and electronic transmissions teaches a system and method for authentication using a device to capture user biometrics and using the biometrics to authenticate the user on a second device. It does not teach automatic login if the Bluetooth channel stayed above a threshold during a recent period of time, otherwise, asking for user credentials.

US patent application 20090104888 by Cox et al, One time passwords for mobile wallets teaches a onetime password generated in a mobile wallet and transmitted to the mobile device. The one time password is used to authenticate the user of the mobile wallet when completing a transaction. It does not teach automatic login if the Bluetooth channel stayed above a threshold during a recent period of time, otherwise, asking for user credentials.

Thus, a need exists for systems for automatic login based on historical proximity.

SUMMARY OF THE INVENTION

A method for facilitating authentication comprising: a first application runs onboard a first mobile device and obtains a first set of configuration parameters, whereby upon a user requesting an operation from a second application onboard a second terminal, if the distance between said second terminal and said first mobile device has stayed below a predetermined threshold during a recent period of time: said second application automatically obtains a second set of configuration parameters from said first application using wireless communication, wherein said second set of configuration parameters corresponds to said first set of configuration parameters, whereby upon authentication of said second set of configuration parameters, the user is authorized to perform the operation, wherein the user does not enter credentials, wherein the recent period of time spans between the last time an application onboard said second terminal obtained configuration parameters from said first mobile device and the current time; whereby if the distance between said second terminal and said first mobile device has exceeded a distance threshold during the recent period of time: the user is requested to enter credentials selected from the group consisting of: pass code, pass phrase, gesture, voice command, finger print, wherein the operation is selected from the group consisting of: login, authorize payment, authorize access;

whereby while the second application is active, if the distance between said first mobile device and said second terminal exceeds a distance threshold: said second application determines the current location information using a means selected from the group consisting of: GPS, Wi-Fi triangulation, cell tower, whereby if the current location is within a predetermined geo-location, said second application performs an action selected from the group consisting of: no action, log out, revoke authentication, revoke a user token, cancel a transaction, lock a device, play a long sound file whereby if the current location is outside a predetermined geo-location, said second application performs an action selected from the group consisting of: log out, revoke authentication, revoke a user token, cancel a transaction, lock a device, play a long sound file issue an audible alert, call a mobile phone and issue a message, encrypt data, delete data, delete said second application, clear memory, send an email message comprising the current location information, send a Short Message Service message comprising the current location information, send a message comprising the current location information to a remote server.

A method for facilitating authentication comprising: a first application runs onboard a first mobile device and obtains a first set of configuration parameters, whereby upon a user requesting an operation from a second application onboard a second terminal, if the distance between said second terminal and said first mobile device has stayed below a predetermined threshold during a recent period of time: said second application automatically obtains a second set of configuration parameters from said first application using wireless communication, wherein said second set of configuration parameters corresponds to said first set of configuration parameters, whereby upon authentication of said second set of configuration parameters, the user is authorized to perform the operation, whereby said second application does not request credentials from the user, wherein the recent period of time spans between the last time an application onboard said second terminal obtained configuration parameters from said first mobile device and the current time, wherein the operation is selected from the group consisting of: login, authorize payment, authorize access, wherein said credentials are selected from the group consisting of: pass code, pass phrase, gesture, voice command, finger print;

Whereby if said second application determines the distance between said second terminal and said first mobile device exceeded a predetermined threshold during the recent period of time: said second application requests credentials from the user.

A method for facilitating authentication comprising: a first application runs onboard a first mobile device and obtains a first set of configuration parameters from a remote server, whereby said first mobile device connects to said remote server using a cellular data service, wherein said first set of configuration parameters comprises authentication data selected from the group consisting of: user credentials, user certificates, keys, account information, commands, one time password function, whereby said first set of configuration parameters comprises a set of authorized terminal identifiers; whereby upon a user requesting an operation from a second application onboard a second terminal, if a Bluetooth signal between said first mobile device and said second terminal has stayed above a predetermined threshold during a recent period of time: said second application requests information from said first application using Bluetooth short wireless communication, whereby said first application authenticates said second terminal using said set of authorized terminal identifiers, wherein said set of authorized terminal identifiers is obtained from said remote server, whereby upon successful authentication, said second application automatically obtains a second set of configuration parameters from said first application, wherein said second set of configuration parameters corresponds to said first set of configuration parameters, whereby upon authentication of said second set of configuration parameters, the user is authorized to perform the operation, wherein said second application does not request credentials from the user, wherein the recent period of time spans between the last time an application onboard said second terminal obtained configuration parameters from said first mobile device and the current time, wherein said credentials are selected from the group consisting of: pass code, pass phrase, gesture, voice command, finger print, wherein the operation is selected from the group consisting of: login, authorize payment, authorize access;

whereby if the Bluetooth signal between said first mobile device and said second terminal has dropped below a predetermined threshold during the recent period of time: said second application requests credentials from the user.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

Figure 1:
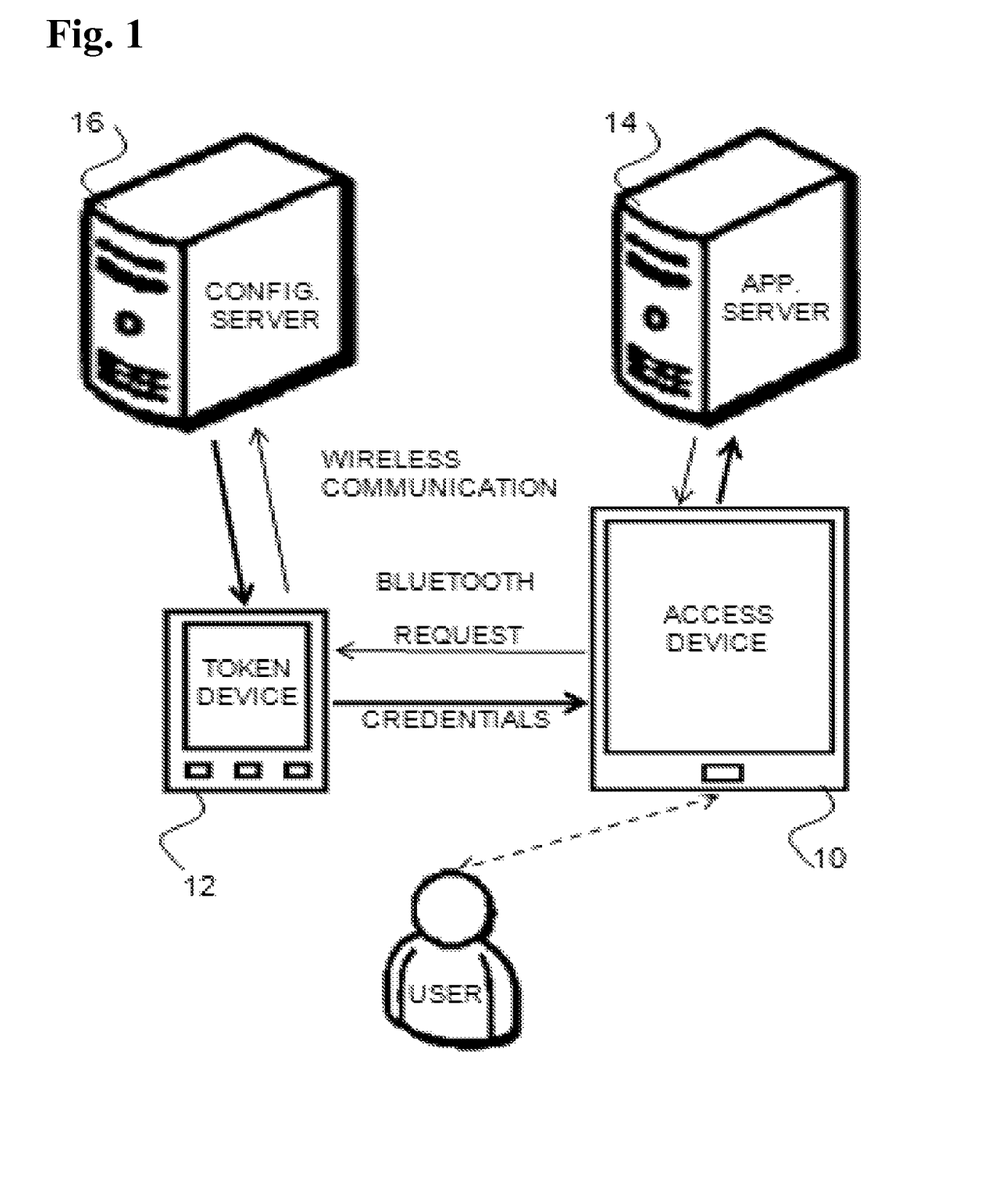
FIG. 1 is a schematic illustrating an authentication system using a soft token.

This patent teaches a method for facilitating authentication using proximity:
1—Passwordless authentication to any application/operation on a terminal based on user authentication device not leaving proximity of the terminal since the time of last authentication operation 2—Passwordless authentication on multiple terminals based on user authentication device not leaving proximity of a terminal since the time of last authentication operation on that terminal 3—Automatic logout from an application on a terminal if the user authentication device is detected out of proximity of a terminal 4—Automatic alarm if the user authentication device is detected out of proximity of a terminal outside of a predetermined zone 5—Any device Referring to FIG. 1, an authentication system according to a first embodiment includes an access device 10, a token device 12, a configuration server 16 and an application server 14.

Access device 10 can be any terminal device. Access device 10 communicates with application server 14 using wireless/cellular data communication or wired communication. Access device 10 runs applications or operations that collaborate with application server 14 to provide services to the user such as data, documents, forms, workflows, CRM, payment operations, etc.

Token device 12 is a mobile terminal that runs a soft token application. Token device 12 communicates with configuration server 16 using wireless communication/cellular data communication.

The access device 10 communicates with the token device 12 using Bluetooth communication.

Figure 2:
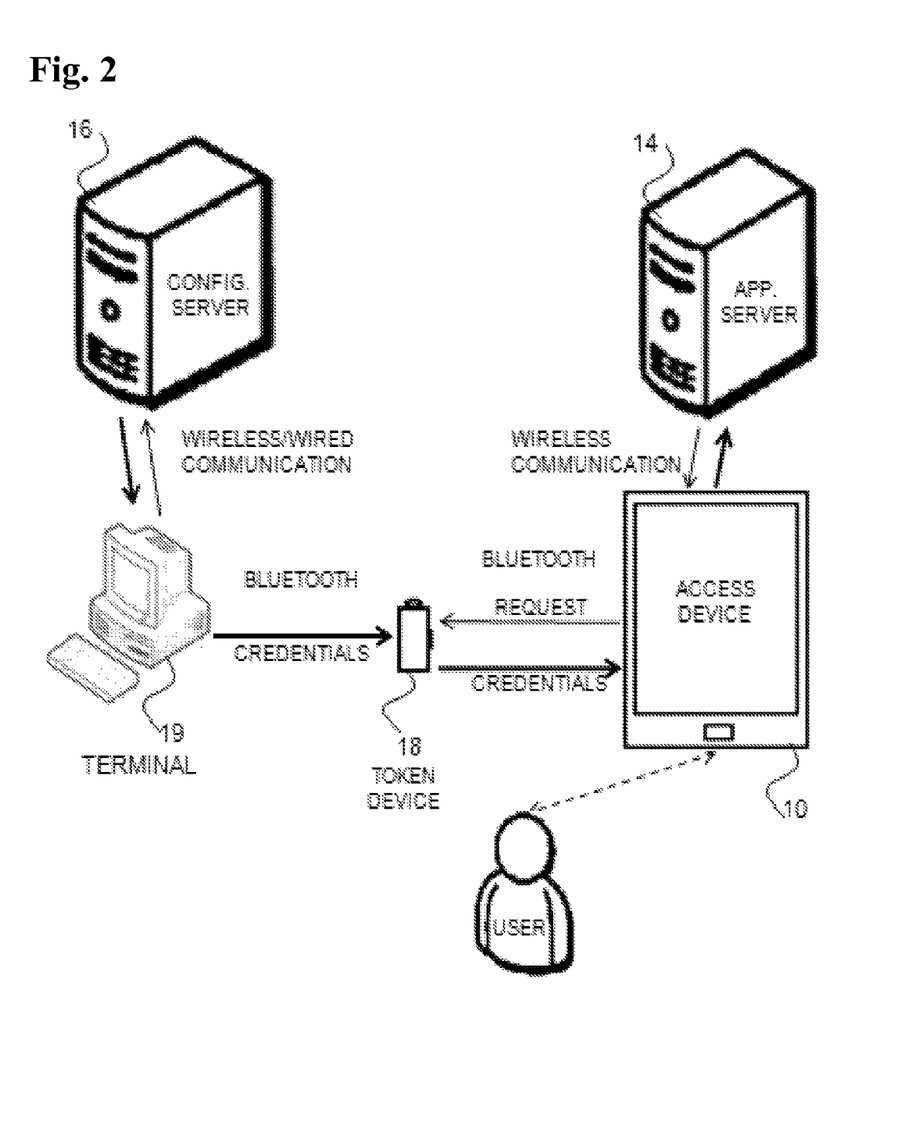
FIG. 2 is a schematic illustrating an authentication system using a hard token.

Referring to FIG. 2, a second authentication system according to a first embodiment includes an access device 10, a second token device 18, a configuration server 16, an application server 14, and terminal 19.

Token device 18 can be a Bluetooth keychain, a Bluetooth bracelet, a Bluetooth badge, or a Bluetooth watch.

Terminal 19 can be any terminal device. Terminal 19 communicates with configuration server 16 using wireless or wired communication.

Terminal 19 communicates with token device 18 using Bluetooth communication.

Token device 18 communicates with the token device 12 using Bluetooth communication.

Figure 3:
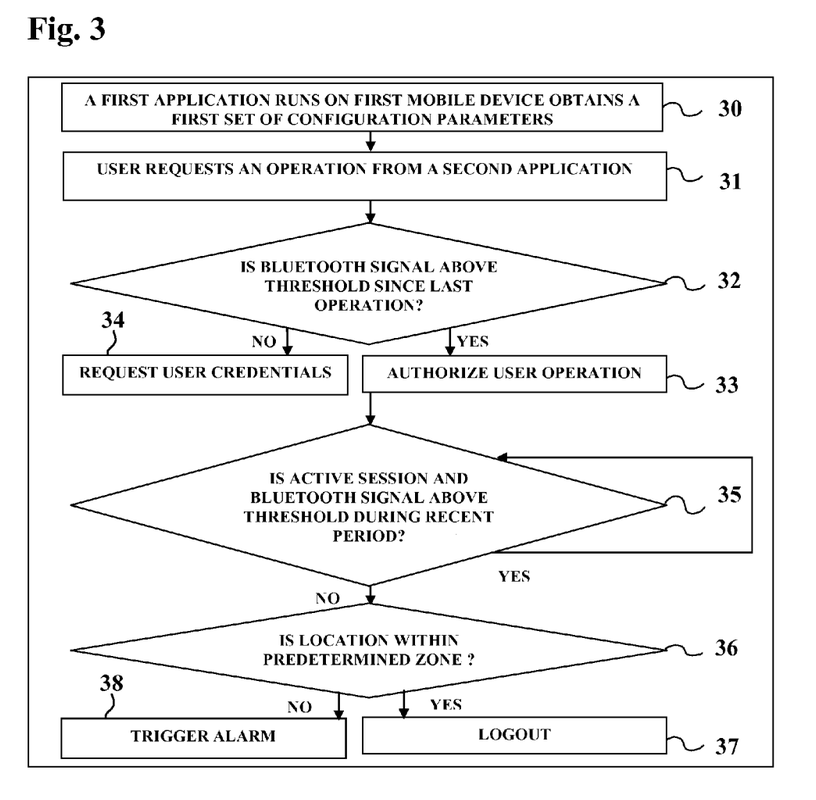
FIG. 3 is a flowchart illustrating a method for facilitating authentication using proximity.

Referring to FIG. 3, a method for facilitating authentication using proximity includes a first application that runs onboard a token device 12 or 18 and that obtains a first set of configuration parameters from configuration server 16 in step 30.

Token device 12 generally has a soft application that authenticates the user using username/password or biometrics, and that obtains configuration parameters for the user from configuration server 16 through wireless communication such as Wi-Fi 3G, 4G . . . . The configuration parameters comprise user credentials, user certificates, user keys, user account information, commands, one time password function, and user rules.

The configuration parameters can comprise IDs of token devices 12 that are authorized to obtain configuration parameters from configuration server 16.

The configuration parameters can comprise IDs of access devices 10 that are authorized to obtain configuration parameters from token devices 12.

Token device 12 generally keeps the user credentials in RAM and does not store them in flash. The soft token generally locks after a predetermined number of hours, generally a day or a week. When the maximum period is reached, the user has to authenticate again. This feature enables to control the soft token through a configuration server, and to manage revocation of user authorizations. For example, if a user leaves the company, the IT administrator can update the user configuration parameters in order to block the user access.

Token device 18 obtains configuration parameters for the user from configuration server 16 through proxy terminal 19. Generally, the user runs an application onboard terminal 19 that obtains configuration parameters for the user from configuration server 16 through wired or wireless communication, and that sends the user configuration parameters to token 18 through Bluetooth communication. The user parameters are written to flash memory onboard token device 18.

The configuration parameters can comprise IDs of token device 18 and/or terminals 19 that are authorized to obtain configuration parameters from configuration server 16 or proxy terminal 19.

The configuration parameters can comprise IDs of access devices 10 that are authorized to obtain configuration parameters from token devices 18.

In a preferred embodiment, proxy terminal 19 or relay application runs in a browser on a third device and connects to a remote server using TCP/IP.

In step 31, a user requests an operation from a second application onboard access device 10. An operation can be either login, authorize payment or authorize access, etc.

In step 32, if Bluetooth signal is above a threshold during the last period since the last operation, in step 33, the second application authorizes the user operation; otherwise, the user is requested to enter credentials in step 34.

The Bluetooth signal strength between two Bluetooth devices is generally inversely proportional to the distance between the two devices. The distance can be estimated using signal information.

If the distance between a token device and an access device has stayed below a predetermined threshold during the period since the last operation that the user successfully completed, the application onboard access terminal 10 is deemed trustable and can automatically obtain configuration parameters from the token device 12 or 18 using wireless communication (such as Bluetooth, NFC, Wi-Fi . . . ), and if the user credentials from the configuration parameters are authenticated, the user is authorized to perform the requested operation without a need to enter credentials.

If the distance between a token device and an access device has exceeded a distance threshold during the period since the last operation that the user successfully completed, access terminal 10 is no longer trustable: the user is requested to enter credentials such as pass code, pass phrase, gesture, voice command, finger print.

If is noted that token device 12 or 18 can authenticate terminal 10 using configuration parameters. If the ID of terminal 10 is not authorized to receive information, token device 12 or 18 will not send user credentials or configuration parameters.

If is noted that terminal 10 needs Bluetooth pairing to token device 12 or 18.

In a preferred embodiment, the user runs multiple applications on a first access device 10, and that after authentication into one application on a first access device 10, and if the user token device 12 and/or 18 stays within proximity of access device 10, the user can launch any number of applications on the first access device 10, and the user will not be asked to provide credentials again after a very first login.

Only if the user token device 12 and/or 18 leaves proximity of the user first access device 10, then next time the user launches an application or performs an operation on the first access device 10, the user will be required to enter credentials. Also, if an application is active, it will lock automatically. For example, the first time a user runs a first proximity security enabled application on access device 10 such as iPad/Android/Windows/Blackberry/POS/lock terminal or any other terminal, the user must enter a pass code, and the application obtains other user credentials from the token device 12 and/or 18. Next, when the user runs other proximity security enabled applications, those other applications will not ask the user for pass code if the user token device (hard token or a soft token) stayed within proximity of the user terminal. The will obtain the user credentials from token device 12 and/or 18. If the user leaves proximity of the terminal 10 and later comes back to access device 10, and if the user tries to get into any proximity security enabled application, the user will be asked automatically to enter a pass code.

If the user runs an application on a second access devices 10, and that after authentication, if the user device 12 and/or 18 stays within proximity of the user second access terminal 10, the user can launch any number of application on that second access device 10, and the user will not be asked to provide credentials again as the user credentials will be supplied by token device 12 and/or 18.

If the user token device 12 and/or 18 leaves proximity of the second access device 10, then next time the user launches an application or performs an operation on the second access device 10, the user will be required to enter credentials.

Also, if the user device 12 and/or 18 has stayed within proximity of the user first access device 10, while leaving proximity of the user's second access device 10, the user does not need credentials when running applications on the first access terminal 10.

For example, the user starts a first proximity security enabled iOS application on an iPad and authenticates. The user starts another proximity security enabled Windows application on a PC and authenticates. The user with his token device 12 and/or 18 walks away with his/her iPad and leaves proximity of the PC. Next time the user launches a proximity security enabled application on the PC, the user will need to enter a pass code. If the user launches a proximity security enabled application on the iPad, the user will not be asked for a pass code. That is because the user token device did not leave proximity of the iPad.

It is noted that most mobile applications on access device 10 timeout after a few minutes of idle time, thus requiring the user to authenticate again after he/she comes back, thus causing a major inconvenience as the user has to authenticate numerous times a day.

The current invention minimizes the user authentication operations across applications and devices, while maintaining a high level of security, and ensuring that user is authenticated after every time he/she leaves proximity of any one of multiple access terminals 10. While the user is token device 12 and/or 18 stays within proximity of access terminal 10, the token device will supply the user credentials automatically to the application.

This functionality enables robust multi-factor authentication with high convenience and usability.

In another preferred embodiment, when the user is idle for a predetermined time—i.e. no typing on a keyboard, or touching a screen, or moving a mouse detected—then access terminal 10 verifies if token device 12 and/or 18 is within proximity by checking Bluetooth signal. This enables to minimize the number of Bluetooth inquiries.

In step 35, if the user has an active session, and the Bluetooth signal falls below a threshold, in step 36, access device 10 determines the current location information using a GPS, Wi-Fi triangulation or cell tower. In step 37, if the current location is within a predetermined geo-location, access device 10 logs out, revokes authentication, revokes a user token, cancels a transaction, locks a device or plays a long sound file. Playing a long sound file is generally an effective way to block an iOS or Android device until the system locks. For example, if a device timeout is 10 minute and the long sound file lasts 10 minutes to play, when the user leaves a tablet behind, the sound file will start to play. This will lock the device for 10 minutes, and at that time, the operating system locking will trigger.

In step 38, if the current location is outside a predetermined geo-location, access terminal 10 performs the following: log out, revoke authentication, revoke a user token, cancel a transaction, play a long sound file, lock a device, play a long sound file, issue an audible alert, call a mobile phone and issue a message, encrypt data, delete data, delete said second application, clear memory, send an email message comprising the current location information, send a Short Message Service message comprising the current location information, send a message comprising the current location information to a remote server.

For example, when access terminal 10 detects a user is out of proximity, and if the user is out of a trusted geo-location, terminal 10 will alarm. If the user does not come back within a short period of time, terminal 10 will call the user. If the user does not come back within a short period of time, terminal 10 will contact another person such as IT, and will report its location. If terminal 10 cannot reach anybody, it can delete data.

In a preferred embodiment, token device 12 or 18 alerts when it is out of proximity of paired access device 10.

In another preferred embodiment, access device 10 alerts when it is out of proximity of paired token device 12 or 18. Unitary Bluetooth token device 18 has a single transceiver that is a short wireless transceiver and that enables connectivity over short wireless radio bands, it includes a radio and base band IC for Bluetooth or Bluetooth Low Energy (LE). It can include ROM, Flash memory, secured memory, Secure Element (a separate chip where only trusted applications have access) or external memory or any other type of memory. Token device 18 does not include any cellular transceiver, any 3G/4G transceiver or any Wi-Fi or long range transceiver. It is generally very small, less than 30 $cm^3$, and does not have an LCD, or does not have a display more than 3 characters. Furthermore, token device 18 does not have memory larger than 100 Mega Bytes. It may include a buzzer with more than 85 decibels.

Token device 12 or 18 may include a biometric sensor such as a microphone for capturing a sample user voice during initiation and configuration phase. The sample of user voice can be compared to an existing sample of the original user's voice. If correlation factor is above a threshold, the user is authenticated.

The biometric sensor can be an accelerometer for capturing accelerations corresponding to user hand signature and authenticating the user signature against stored user signatures.

The biometric identification signature can be a sample or a pre-processed sample of the user's signature, voice, finger print, iris scan or distinguishing biometric identification. The identification signature can also include variations that correspond to different user conditions, tones, states, moods, etc.

Upon receipt of an event or a message to authenticate the user or upon detection of an event—such as wrong PIN code, change of driver, reset, detection of unknown conditions, a predetermined period of time elapses, the user may be requested to provide biometric information.

Token device 12 or 18 may include an onboard accelerometer, motion sensor or tilt detector. This helps to detect if the user is in motion or idle, and to authorize or deny response depending on if the user is in motion or idle. This is used to reduce a security hack attack "Relay Attack".

Token device 18 may include a crypto chipset for hashing, encryption, AES256, SHA256, Apple Authentication chipset or a Secure Element for storing the user keys, private keys, certificates, public keys.

Token device 18 is designed so that it does not allow reset, and it does not go to discoverable mode unless it is updated through an authorized update application. This prevents fraud in case the device is lost. In an alternative embodiment, the device can reset, but all the user data will be cleared. In another embodiment, the pairing can be reset provided the user validates using biometrics.

Token device 18 may provide Bluetooth headset function. In an embodiment, it enables a wire headset to connect to a port. In another embodiment, token device 18 has a foldable or slide able earpiece.

It is noted that in case of loss of the Bluetooth token device 18, the user can remove or delete the pairing between its device and access terminal 10. This is generally done by going to the operating system and deleting pairing, removing pairing in a database, changing user configuration information, using an application and requesting removal of pairing, or deleting an application. It is noted that the token device 12 or 18 authenticates access terminal 10 every time a connection is requested using device ID obtained from the configuration server.

In a preferred embodiment, token device 12 and/or 18 generates onetime passwords on receipt of a request using a local function that runs on the device or a third party API that runs either on the device or on a remote server. Token device 12 and/or 18 sends the one-time password to access terminal 10 using Bluetooth communication, and a remote server authenticates it.

In another preferred embodiment, token device 12 and/or 18 and access terminal 10 generate a shared secret key using Diffie-Hellman algorithm. The shared secret key is new every time and is different from a previously generated shared key. The shared secret key is used by token device 12 and/or 18 to encrypt data, and by the access terminal 10 to decrypt the data and extract the user credentials.

In another preferred embodiment, access terminal 10 displays a challenge question. The challenge question is new every time and is different from a previously displayed challenge question. Access terminal 10 sends a challenge question identifier corresponding to the displayed challenge question to token device 12 and/or 18. If token device 12 and/or 18 obtains a user response (a challenge question, a phrase, a fingerprint, an iris scan, a photo capture), access terminal 10 authenticates the user response, and if the user response is not authenticated, the token device closes, issues an audible alert, logs out, deletes application, clears memory, blocks communication . . . . In another preferred embodiment, if access terminal 10 cannot connect to token device 12 using Bluetooth short wireless communication, it automatically connects to another token device 18 and vice versa. Access terminal 10 automatically obtains user credentials from token device 12 or 18.

In a preferred embodiment, a container application onboard access terminal 10 is certified for U.S. Food and Drug Administration requirements, and generates user reports that provide document compliance with U.S. Food and Drug Administration requirements. This enables applications that are installed in the container application onboard access terminal 10 to gain quick and easy FDA compliance. Also, this facilitates compliance as one access terminal 10 is upgraded from a version to another, and the contained application do not need to be certified again.

In a preferred embodiment, a developer will take an application, and will run it through a program that appends security features to the application, such as proximity login and logout. This enables to upgrade any application with automatic proximity security features without having to program or compile code. The automatic proximity security features can be configured using an administration console.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for facilitating authentication comprising:
a first application runs onboard a first mobile device and obtains a first set of configuration parameters,
whereby upon a user requesting an operation from a second application onboard a second terminal,
if the distance between said second terminal and said first mobile device has stayed below a predetermined threshold during a recent period of time:
said second application automatically obtains a second set of configuration parameters from said first application using wireless communication,
wherein said second set of configuration parameters corresponds to said first set of configuration parameters,
whereby upon authentication of said second set of configuration parameters, the user is authorized to perform the operation,
whereby said second application does not request credentials from the user,
wherein the recent period of time spans between the last time an application onboard said second terminal obtained configuration parameters from said first mobile device and the current time;
whereby if the distance between said second terminal and said first mobile device has exceeded a distance threshold during the recent period of time:
the user is requested to enter credentials selected from the group consisting of:
pass code, pass phrase, gesture, voice command, finger print, wherein the operation is selected from the group consisting of:
login, authorize payment, authorize access;
whereby if the second application is active,
if the distance between said first mobile device and said second terminal exceeds a distance threshold:
said second application determines the current location information using a means selected from the group consisting of: GPS, Wi-Fi triangulation, cell tower,
whereby if the current location is within a predetermined geo-location, said second application performs an action selected from the group consisting of:
no action, log out, revoke authentication, revoke a user token, cancel a transaction, lock a device, play a long sound file,
whereby if the current location is outside a predetermined geo-location, said second application performs an action selected from the group consisting of:
log out, revoke authentication, revoke a user token, cancel a transaction, play a long sound file, lock a device, play a long sound file, issue an audible alert, call a mobile phone and issue a message, encrypt data, delete data, delete said second application, clear memory, send an email message comprising the current location information, send a Short Message Service message comprising the current location information, send a message comprising the current location information to a remote server.

2. The method of claim 1 whereby:
upon a user requesting an operation in a third application:
if said third application determines that a Bluetooth signal between said first mobile device and a third terminal used for running said third application has stayed above a predetermined threshold during a recent period of time:
the user is authorized to perform the operation,
whereby said third application does not request credentials from the user,
whereby if the Bluetooth signal between said first mobile device and said third terminal dropped below a predetermined threshold during the recent period of time:
said third application requests credentials from the user,
wherein said third terminal can be distinct from said second terminal,
wherein said third application can be distinct from said second application.

3. The method of claim 1 whereby:
said first mobile device is selected from the group consisting of: a Bluetooth keychain, a Bluetooth bracelet, a Bluetooth badge, a Bluetooth watch;
whereby said first mobile device obtains said first set of configuration parameters from a remote server through a relay application,
whereby said relay application runs in a browser on a third device,
whereby said third device connects to said remote server using TCP/IP,
whereby said third device connects to said first mobile device using Bluetooth short wireless communication,
whereby said first mobile device stores said first set of configuration parameters in a flash memory onboard said first mobile device.

4. The method of claim 1 whereby:
said first application and said second application generate a shared secret key using Diffie-Hellman algorithm,
whereby said shared secret key is different from a previously generated shared secret key,
whereby said first application uses said shared secret key to encrypt data comprising at least a part of said first set of configuration parameters,
whereby said second application uses said shared secret key to decrypt the encrypted data.

5. The method of claim 1 whereby:
upon said first application receiving a request,
said first application generates a one-time password using a method selected from the group consisting of: run a third party one-time password API, call a one-time password function;
whereby said first application sends said one-time password to said second application using Bluetooth short wireless communication,
whereby a remote server authenticates said one-time password.

6. The method of claim 1 comprising:
displaying a challenge question,
wherein the displayed challenge question is different from a previously displayed challenge question,
whereby said second application sends a challenge question identifier corresponding to the displayed challenge question to said first application,
whereby if said first mobile device obtains a user response, said first application authenticates the user response,
whereby if the user response is not authenticated,
said first application performs an action selected from the group consisting of:
close, issue an audible alert, log out, delete application, clear memory, block communication,
wherein the user response is selected from the group consisting of:
a voice response to a challenge question, a phrase, a fingerprint, an iris scan, a photo capture.

7. The method of claim 1 whereby:
upon the user requesting access to a second application onboard said second terminal:
if said second terminal cannot connect to said first mobile device using Bluetooth short wireless communication, said second terminal automatically connects to a third mobile device using Bluetooth short wireless communication,
whereby said second application obtains the user credentials from said third mobile device,
wherein said third mobile device is distinct from said first mobile device.

8. The method of claim 1 whereby:
said second application generates a user report, wherein the user report provides document compliance with U.S. Food and Drug Administration requirements.

9. The method of claim 1 comprising:
a remote server storing at least one first set of configuration parameters,
wherein said first set of configuration parameters comprises authentication data selected from the group consisting of:
user credentials, user certificates, user keys, user account information, commands, one time password function, user rules,
whereby said first set of configuration parameters comprises a set of authorized terminal identifiers;
whereby said first application authenticates said second terminal using said set of authorized terminal identifiers,
wherein said set of authorized terminal identifiers is obtained from said remote server.

10. A method for facilitating authentication comprising:
a first application runs onboard a first mobile device and obtains a first set of configuration parameters,
whereby upon a user requesting an operation from a second application onboard a second terminal,
if the distance between said second terminal and said first mobile device has stayed below a predetermined threshold during a recent period of time:
said second application automatically obtains a second set of configuration parameters from said first application using wireless communication,
wherein said second set of configuration parameters corresponds to said first set of configuration parameters,
whereby upon authentication of said second set of configuration parameters,
the user is authorized to perform the operation,
whereby said second application does not request credentials from the user,
wherein the recent period of time spans between the last time an application onboard said second terminal obtained configuration parameters from said first mobile device and the current time,
wherein the operation is selected from the group consisting of:
login, authorize payment, authorize access,
wherein said credentials are selected from the group consisting of: pass code, pass phrase, gesture, voice command, finger print;
whereby if said second application determines the distance between said second terminal and said first mobile device exceeded a predetermined threshold during the recent period of time:
said second application requests credentials from the user.

11. The method of claim 10 whereby:
upon a user requesting an operation in a third application onboard said second terminal,
if said second application determines that a Bluetooth signal between said second terminal and said first mobile device has stayed above a predetermined threshold during a recent period of time:
the user is authorized to perform the operation,
whereby said third application does not request credentials from the user;
whereby if the Bluetooth signal between said second terminal and said first mobile device dropped below a predetermined threshold during the recent period of time:
said third application requests credentials from the user,
wherein said third application is distinct from said second application.

12. The method of claim 10 whereby:
upon a user requesting an operation in a third application onboard a third terminal:
if said third application determines that a Bluetooth signal between said third terminal and said first mobile device has stayed above a predetermined threshold during a recent period of time:
the user is authorized to perform the operation,
whereby said third application does not request credentials from the user,
whereby if the Bluetooth signal between said third terminal and said first mobile device dropped below a predetermined threshold during the recent period of time:
said third application requests credentials from the user,
wherein said third terminal is distinct from said second terminal.

13. The method of claim 10 whereby:
if the second application is active,
if the Bluetooth signal between said first mobile device and said second terminal drops below a predetermined threshold: said second application performs an action selected from the group consisting of:
log out, revoke authentication, revoke a user token, cancel a transaction, lock a device, play a long sound file, issue an audible alert, call a mobile phone and issue a message, encrypt data, delete data, delete said second application, clear memory, send an email message comprising the current location information, send a Short Message Service message comprising the current location information, send a message comprising the current location information to a remote server.

14. The method of claim 10 whereby:
upon said first application receiving a request, said first application generates a one-time password using a method selected from the group consisting of:
run a third party one-time password API, call a one-time password function;
whereby said first application sends said one-time password to said second application using Bluetooth short wireless communication,
whereby a remote server authenticates said one-time password.

15. The method of claim 10 whereby:
said second application generates a user report, wherein the user report provides document compliance with U.S. Food and Drug Administration requirements.

16. The method of claim 10 whereby:
upon a user requesting an operation in a second application:
if the recent period of time exceeded a predetermined threshold, said second application requests credentials from said user.

17. The method of claim 10 whereby:
said second application verifies the Bluetooth signal is above a predetermined threshold only if user input is not detected for a predetermined period of time,
wherein user input is selected from the group consisting of: typing on a keyboard, touching a screen, moving a mouse.

18. A method for facilitating authentication comprising:
a first application runs onboard a first mobile device and obtains a first set of configuration parameters from a remote server,
whereby said first mobile device connects to said remote server using a cellular data service,
wherein said first set of configuration parameters comprises authentication data selected from the group consisting of:
user credentials, user certificates, keys, account information, commands, one time password function,
whereby said first set of configuration parameters comprises a set of authorized terminal identifiers;
whereby upon a user requesting an operation from a second application onboard a second terminal,
if a Bluetooth signal between said first mobile device and said second terminal has stayed above a predetermined threshold during a recent period of time:
said second application requests information from said first application using Bluetooth short wireless communication,
whereby said first application authenticates said second terminal using said set of authorized terminal identifiers,
wherein said set of authorized terminal identifiers is obtained from said remote server,
whereby upon successful authentication,
said second application automatically obtains a second set of configuration parameters from said first application,
wherein said second set of configuration parameters corresponds to said first set of configuration parameters,
whereby upon authentication of said second set of configuration parameters,
the user is authorized to perform the operation,
wherein said second application does not request credentials from the user,
wherein the recent period of time spans between the last time an application onboard said second terminal obtained configuration parameters from said first mobile device and the current time,
wherein said credentials are selected from the group consisting of: pass code, pass phrase, gesture, voice command, finger print,
wherein the operation is selected from the group consisting of: login, authorize payment, authorize access;
whereby if the Bluetooth signal between said first mobile device and said second terminal has dropped below a predetermined threshold during the recent period of time:
said second application requests credentials from the user.

19. The method of claim 18 whereby:
when said second application authorizes a user,
if said first mobile device is outside a predetermined distance from said second terminal, said second application determines the current location information using a means selected from the group consisting of: GPS, Wi-Fi triangulation, cell tower,
whereby if the current location is within a predetermined zone,
said second application performs an action selected from the group consisting of:
no action, log out, revoke authentication, revoke a user token, cancel a transaction, lock a device, play a long sound file,
whereby if the current location is outside a predetermined zone,
said second application performs an action selected from the group consisting of:
log out, revoke authentication, revoke a user token, cancel a transaction, lock a device, play a long sound file, issue an audible alert, call a mobile phone and issue a message, encrypt data, delete data, delete said second application, clear memory, send an email message comprising the current location information, send a Short Message Service message comprising the current location information, send a message comprising the current location information to a remote server.

20. The method of claim 18 whereby:

upon a user requesting an operation in a third application onboard said second terminal,
 if said second application determines that a Bluetooth signal between said second terminal and said first mobile device has stayed above a predetermined threshold during a recent period of time:
  the user is authorized to perform the operation,
  whereby said third application does not request credentials from the user,
 whereby if the Bluetooth signal between said second terminal and said first mobile device dropped below a predetermined threshold during the recent period of time:
  said third application requests credentials from the user,
  wherein said third application is distinct from said second application.

* * * * *